United States Patent [19]

Müller

[11] Patent Number: 4,924,156

[45] Date of Patent: May 8, 1990

[54] DRIVER CIRCUIT FOR A D.C. MOTOR WITHOUT COMMUTATOR

[75] Inventor: Rolf Müller, München, Fed. Rep. of Germany

[73] Assignee: Papst-Motoren GmbH & Co. KG, Fed. Rep. of Germany

[21] Appl. No.: 199,232

[22] Filed: May 27, 1988

[30] Foreign Application Priority Data

May 27, 1988 [DE] Fed. Rep. of Germany ....... 3717863

[51] Int. Cl.$^5$ .............................................. H02P 6/02
[52] U.S. Cl. ..................................... 318/254; 318/138
[58] Field of Search ........................ 318/138, 254, 439

[56] References Cited

U.S. PATENT DOCUMENTS

| | | | |
|---|---|---|---|
| 4,317,072 | 2/1982 | Goof et al. ...................... | 318/254 X |
| 4,525,658 | 6/1985 | Yanagida ........................ | 318/254 X |
| 4,546,293 | 10/1985 | Peterson et al. ................ | 318/138 X |
| 4,672,274 | 6/1987 | Suganuma ....................... | 318/138 X |
| 4,698,563 | 10/1987 | Ban ............................. | 318/138 X |

OTHER PUBLICATIONS

Angelo Alzati & Antonella Lanati, "Highly Efficient and Precise Brushless Drive System", 1985, SGS Microelectronica SpA, Italy.
Data sheet, "Four Phase Brushless Motor Driver", SGS, 7DA8776, Dec./1986, pp. 819–822, Italy.
Data sheet, "Current Mode PWM Controller", SGS, Dec. 1986, p. 823, Italy.
Data sheet, "Bidirectional Three-Phase Brushless DC Driver", Dec. 1986, pp. 633–640, SGS, Italy.
Data sheet, "Three-Phase Brushless DC Motor Driver", Dec. 1986, p. 641 SGS, Italy.

Primary Examiner—Bentsu Ro
Attorney, Agent, or Firm—Spencer & Frank

[57] ABSTRACT

A method is disclosed for the low-loss regulation of a d.c. motor without commutator and of a semiconductor circuit in which, during a commutation phase at reduced motor power or rpm as given by a position indicator, the end transistors or one end transistor initially operates temporarily as a switch and thereafter temporarily as an analog amplifier element. During the analog period, a current is available which changes slowly according to a ramp function.

8 Claims, 5 Drawing Sheets

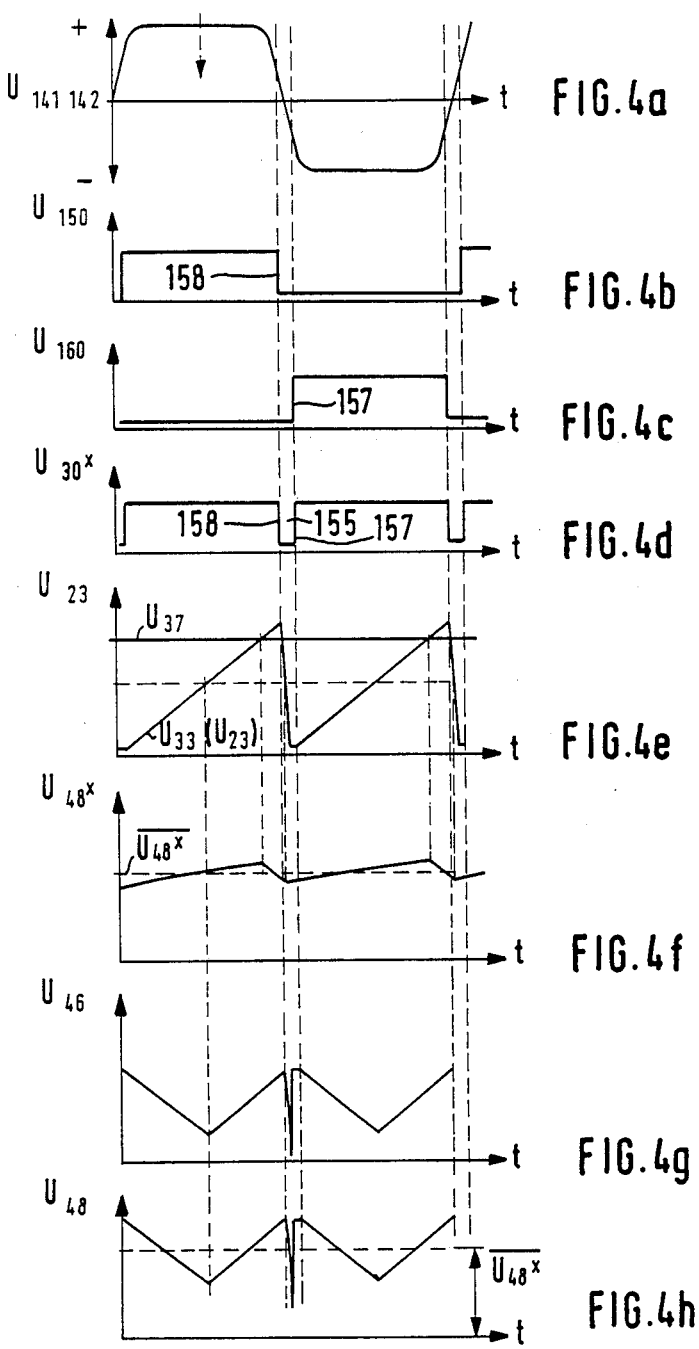

DRIVER CIRCUIT FOR A D.C. MOTOR WITHOUT COMMUTATOR

BACKGROUND OF THE INVENTION

The invention relates to a driver circuit for the electronic control of the rpm of brushless d.c. motors by influencing the motor power by way of the ratio of the ON duration to the OFF duration of current pulses fed to at least one motor winding, with the ON and OFF edges of the variable duration current pulses being controlled in a rampshaped manner.

Such a driver circuit is disclosed, in particular, in FIG. 7 of WO 87/02528.

SUMMARY OF THE INVENTION

Based on this state of the art, it is the object of the invention to provide a driver circuit which permits a constant rpm without the development of noise, independently of the load and motor tolerances and independently of the motor parameters and which additionally is composed of the least number of easily integrated components.

This is accomplished according to the invention in that signal proportional in frequency to measured rpm is used as a measure of the rpm for rpm regulation; the rpm proportional frequency is fed to a frequency/voltage converter which generates a signal value that changes monotonously within one period duration and whose limit value at the end of the period duration can be fed to a comparator stage which influences the ON-durations of the current pulses fed to the stator windings of the motor. A triangular wave generator is provided to control the ramp-shaped current curve by generating a triangular wave signal whose peak lies at least approximately in the middle of a one period duration defined by the frequency/voltage converter, with the triangular-wave generator receiving its informations for forming the peak from the monotonously changing signal of the frequency/voltage converter.

BRIEF DESCRIPTION OF THE DRAWINGS

The invention will now be described in greater detail with reference to an embodiment that is illustrated in the drawing figures. It is shown in:

FIGS. 4a–4h an overview of the voltage/current curves during a time period at or between various points in the circuit of FIGS. 1 to 3 to explain the operation, including FIG. 4a which shows the time curve of the output signal of Hall element 14;

FIG. 4b and 4c which show the Hall element pulse from Hall signal amplifiers 15 and 16;

FIG. 4d which shows the sum Hall signal pulse behind coupling resistors 29 and 30;

FIG. 4e which shows the sawtooth voltage $U_{23}$ at the output of generator 19;

FIG. 4f which shows the "charging voltage" at the charging capacitor 45 without a superposed signal from triangular-wave generator 32;

FIG. 4g which shows the output signal $U_{46}$ of delta generator 32; and

FIG. 4h which shows the actual voltage course at point 48;

DESCRIPTION OF THE PREFERRED EMBODIMENT

Figure 1:
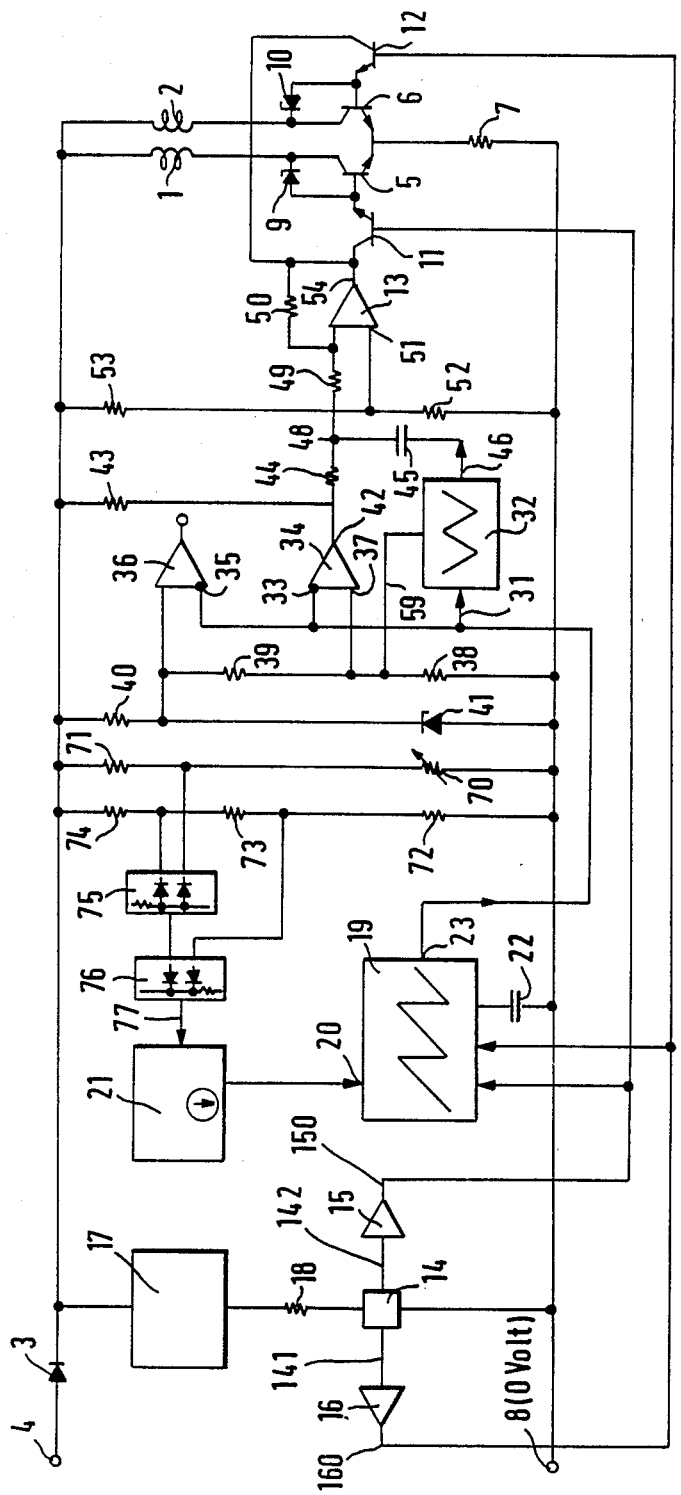
FIG. 1, a block circuit diagram of the driver circuit according to the invention.

The block circuit diagram shown in FIG. 1 shows a driver circuit for a two-phase, two-conductor, brushless d.c. motor, including a first stator winding 1 and a second stator winding 2. The d.c. motor has, for example, a power range up to about 3 watts and a rated input voltage of 12 volts. The ends of stator windings 1, 2 are connected via a diode 3 with a terminal 4 for the positive pole of the operating voltage source.

As can be seen in FIG. 1, stator windings 1 and 2 respectively lie in the collector circuit of a first power transistor 5 and the collector circuit of a second power transistor 6. The emitters of power transistors 5 and 6 are connected with one another and, via an emitter resistor 7 acting as a safety resistor and as a feedback resistor for the analog current control to be described below, to a terminal 8 for the negative pole of the operating voltage source. By alternatingly periodically actuating power transistors 5 and 6, magnetic fields are alternatingly generated by stator windings 1 and 2 to cause the permanently magnetic rotor of the brushless d.c. motor to rotate. The turn-off voltages are here limited by Zener diodes 9 and 10 which bridge the base-collector paths of power transistors 5 and 6.

The base of the first power transistor 5 is connected with the emitter of a first driver transistor 11 serving as analog switch and the base of the second power transistor 6 is connected with the emitter of a second driver transistor 12 which also serves as analog switch. The collectors of driver transistors 11 and 12 are connected with the output of an inverter amplifier 13 which furnishes delta (triangular-wave) pulses at periodic intervals to permit changing the torque of the d.c. motor by changing the ratio of the duration of the ON-state to the duration of the OFF-state within each commutation period of the d.c. motor. The motor current is here turned on and off in a "smooth" manner corresponding to the sloped edges of the triangular-wave pulses so as to suppress as much as possible any switching noises and high frequency interferences. During the turning on and off, power transistors 5 and 6 temporarily operate as linear amplifiers and, depending on the amplitude of the delta signal furnished by inverter amplifier 13, for a longer or shorter period of time between the intervals for turning on and off, they operate as switching transistors so that current pulses flow through stator windings 1 and 2. These current pulses have approximately the shape of trapezoids, with the widths of the trapezoid varying and, in the extreme case, the trapezoids become so narrow that they become a triangle. By alternatingly actuating driver transistors 11 and 12 which serve as analog switches, it is accomplished that the pulses, which rise and fall according to a ramp function, are fed alternatingly to the first stator winding 1 and to the second stator winding 2.

The momentary rotary position of the rotor of the twophase, two-conductor, brushless d.c. motor (not shown in the drawing) is detected with the aid of a sensor circuit which includes a Hall element 14 whose outputs are connected with a first Hall signal amplifier 15 and with a second Hall signal amplifier 16. Hall signal amplifiers 15 and 16 are configured as a double comparator or a double operational amplifier and generate, from the Hall signals, two rectangular signals offset by 180° el which, due to the connection of resistors at the inputs of Hall signal amplifiers 15 and 16, have a slightly asymmetrical shape so that each pulse signal is somewhat shorter than the pulse pauses and, for example, a positive pulse signal will never be present simultaneously at the outputs of Hall signal amplifiers 15 and 16. Thus, a descending edge of a pulse furnished by one of Hall signal amplifiers 15 or 16 is followed, with a short delay by a rising edge at the output of the respectively other Hall signal amplifier 16 or 15.

As can be seen in FIG. 1, the output of the first Hall signal amplifier 15 is connected with the base of the first driver transistor 11 and the output of the second Hall signal amplifier 16 is connected with the base of the second driver transistor 12. The alternating occurrence of the rectangular Hall signal pulses thus causes the analog switches formed by driver transistors 11 and 12 to be alternatingly switched on and off so that alternatingly a current pulse flows through the first stator winding 1 and the first power transistor 5, on the one hand, and through the second stator winding 2 and the second power transistor 6 on the other hand. The torque associated with the current pulses here depends on the time during which the Hall signal pulses and the delta pulses appearing at the output of inverter amplifier 13 overlap. The delta pulses here have a duration which is never longer than the duration of the Hall signal pulses. If the delta pulses have their maximum length, a maximum torque is realized and current pulses having a trapezoidal shape flow through each one of power transistors 5 and 6 as long as the rpm regulator operates in the intended operating range.

Via a thermal protection circuit 17 and a biasing resistor 18 Hall element 14 is connected with the operating voltage. Thermal protection circuit 17 constitutes an overload protection or a monitoring circuit for the temperature of power transistors 5 and 6. If the maximum permissible barrier layer temperature of power transistors 5 and 6 is exceeded, thermal protection circuit 17 enables the driver circuit to be turned off and to be kept in the OFF-state for a certain period of time due to hysteresis. This is accomplished, for example, simply by interrupting the current supply to Hall element 14 so that no further Hall signal pulses are generated and the analog switches formed by driver transistors 11 and 12 remain in the OFF-state.

Figure 2:
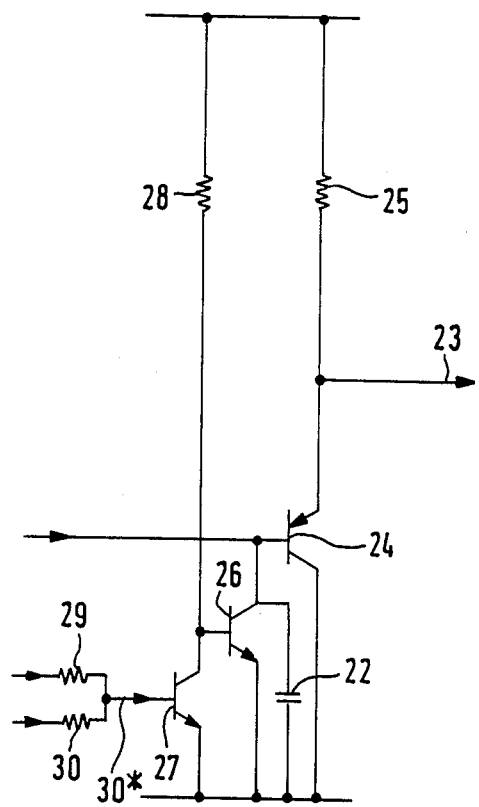
FIG. 2, the sawtooth generator of the driver circuit according to FIG. 1.

The Hall signal pulses furnished by Hall signal amplifiers 15 and 16 not only serve to control driver transistors 11 and 12 but also as synchronization signals for a sawtooth generator 19 which is shown in simplified form in FIG. 1 and in detail in FIG. 2. Sawtooth generator 19 utilizes the frequency of the output signal of Hall element 14 which serves as a measure for the rpm of the d.c. motor and generates sawtooth pulses whose maximum amplitude changes with the frequency of the Hall signal pulses and thus with the rpm of the d.c. motor. Additionally, the maximum amplitude of the sawteeth generated by sawtooth generator 19 depends on a slope control signal which is fed to the control signal input 20 of sawtooth generator 19 by a controllable current source 21 whose significance will be described below.

Sawtooth generator 19 includes a charging capacitor 22 which is charged by the current fed in through control signal input 20. The rate at which charging capacitor 22 is charged depends on the magnitude of the current furnished by controlled current source 21. With increasing charge, the charging voltage of charging capacitor 22 increases and thus also the momentary voltage of the sawtooth signal present at output 23 of sawtooth generator 19. FIG. 2 shows that charging capacitor 22 is connected, on the one hand, with signal control input 20 and, on the other hand, with the base of an impedance converter transistor 24 whose collector is connected directly, as is charging capacitor 22, with one of the poles of the operating voltage source. The emitter circuit of impedance converting transistor 24 includes an emitter resistor 25 at which the output voltage of sawtooth generator 19 is picked up.

Charging capacitor 22 additionally is connected in parallel with the collector-emitter circuit of a discharging transistor 26 whose base is connected with the collector of an actuating transistor 27 whose emitter is connected directly with the emitter of discharging transistor 26 and whose collector is connected via a collector resistor 28 with the operating voltage source. The base of actuating transistor 27 is connected via a coupling resistor 29 with the output of the first Hall signal amplifier 15 and via a coupling resistor 30 with the output of the second Hall signal amplifier 16. For that reason, actuating transistor 27 switches through whenever pulse pauses exist for both signal furnished by Hall signals amplifiers 15 and 16. This is always the case after one-half an electrical revolution of the d.c. motor following the trailing edge of the Hall signal pulse at the output of one of Hall signal amplifiers 15 or 16 until the respective other Hall signal amplifier 16 or 15 furnishes a leading edge. During this time, charging capacitor 22 is kept discharged. Thereafter the charging voltage is able to increase until pulse pauses again reach the base of actuating transistor 27 via the two coupling resistors 29 and 30.

The above description of sawtooth generator 19 shows that the duration of the sawtooth pulses corresponds essentially to the duration of the Hall signal pulses and that the maximum amplitude is greater the slower the d.c. motor rotates and the more current is furnished by controlled current source 21. Thus, charging capacitor 22 is charged by the controllable or controlled current source 21 and is quickly discharged during each commutation process. A sum signal formed from the output signals of Hall signal amplifiers 15 and 16 serves to effect the discharge.

The output 23 of sawtooth generator 19 is connected with the control input 31 of a triangular-wave generator 32, with the inverting input 33 of a comparator 34 and with the inverting input 35 of an alarm comparator 36.

The non-inverting input 37 of comparator 34 is connected with a first voltage divider including a first resistor 38, a second resistor 39 and a third resistor 40 in such a manner that the non-inverting input 37 receives about 75 % of the voltage present across the series connection of the first resistor 38 and the second resistor 39. These resistors 38 and 39 bridge a Zener diode 41 which furnishes a constant reference voltage as the rpm reference signal even if the operating voltage for the described driver circuit changes.

The output 42 of comparator 34 is connected via a resistor 43 of, for example 1 megohm, with the positive pole of the operating voltage source. Additionally, output 42 is connected via a resistor 44 having a significantly lower resistance value of, for example, 51 kiloohms with a charging capacitor 45. Resistor 44 and charging capacitor 45 form an RC member which is charged slowly via collector resistor 43 and resistor 44 and with the output 42 of comparator 34 open and is discharged relatively quickly via resistor 44 and with the output 42 of comparator 34 closed. This charging and discharging occurs at periodic intervals corresponding to the periodic intervals with which the sawtooth signal at inverting input 33 exceeds the reference voltage at non-inverting input 37. The average charge or voltage developing at charging capacitor 45 is thus a function of the rpm of the d.c. motor. Each time the sawtooth voltage present at inverting input 3 is higher than the rpm reference voltage at non-inverting input 37, charging capacitor 45 is discharged somewhat, with an average, not quite smooth direct voltage developing at charging capacitor 45 which voltage drops when the discharge periods become longer due to the rpm going down and thus the sawtooth amplitude becoming higher.

The above described arrangement thus constitutes a frequency/voltage converter whose output voltage is higher the higher the rpm of the d.c. motor. Fluctuations in voltage within one period here usually lie only in a range from 1 to 5% of the average direct voltage and are thus essentially negligible.

As can be seen in FIG. 1, the terminal of charging capacitor 45 not connected with resistor 44 is not connected to ground but to the output 46 of triangular-wave generator 32 which is synchronized with the sawtooth signal via control input 31. For this reason, the charging voltage picked up at the connection 48 of resistor 44 with charging capacitor 45 has superposed on it the triangular-wave signal voltage furnished by delta generator 32 with a period duration which corresponds to the period duration of the sawtooth signal. The voltage composed of the direct voltage component and the triangular-wave signal voltage component is fed as a control voltage via a resistor 49 to the inverting input of inverter amplifier 13 which is stabilized by means of an internal capacitor (not shown in the drawing) and whose gain is defined by the resistor 49 and a resistor 50. For this reason, the ratio of these resistors to one another determines the slope of the current rise or current drop if the sum voltage present at connection 48 drops below the comparison voltage at the non-inverting input 51 of inverter amplifier 13, with this comparison voltage being fixed by the ratio between resistors 52 and 53. If thus the direct voltage component across charging capacitor 45 drops due to the rpm becoming smaller as a result of, for example, an increase in load, the amplitude of the triangular-wave signal shifted by the direct voltage component lies below the voltage present across non-inverting input 51 for a now longer period of time. As a consequence, the width of the delta pulses appearing at output 54 of inverter amplifier 13 becomes greater so that the pulse pause ratio at the base of the respective power transistor 5 or 6 selected by the Hall signal generator pulses increases and accordingly the deltashaped or trapezoidal current pulses through stator windings 1 and 2 become broader. Due to the now broader current pulses in stator windings 1 and 2, a higher torque results for the d.c. motor which counteracts, for example, the drop in rpm caused by an increase in load. If the rpm rises again, the sawtooth signal pulses become shorter and so do the time periods during which the sawtooth signal at the inverted input 33 of comparator 44 lies above the rpm reference voltage at non-inverting input 37. For this reason, the discharging times of charging capacitor 45 become shorter so that the direct voltage component at connection 48 increases again and the pulse durations at output 54 become shorter again as the rated rpm is approached. Correspondingly reversed are the relationships if the rpm of the d.c. motor rises above the rated rpm.

Figure 3:
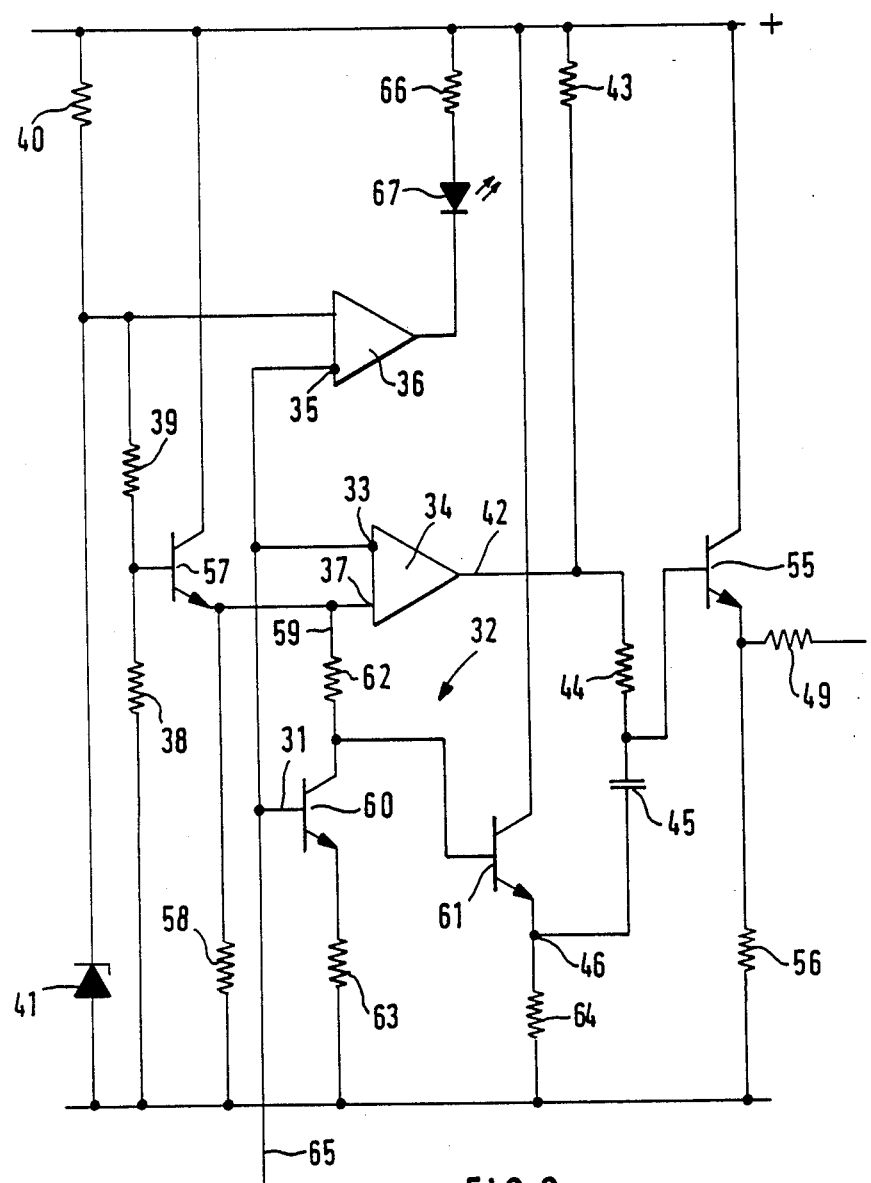
FIG. 3, the triangular-wave generator and adjacent components of the driver circuit according to the invention.

FIG. 3 shows in greater detail the part of the circuit including triangular-wave generator 32, comparator 34 and alarm comparator 36 shown in the block circuit diagram of FIG. 1. Components coinciding with components shown in FIG. 1 bear the same reference numerals. Additionally, FIG. 3 shows an output transistor 55 whose emitter is connected with the resistor 49. An emitter resistor 56 lies in the emitter circuit.

FIG. 3 also shows how the rpm reference voltage at the tap between resistors 38 and 39 is conducted, via an impedance converter transistor 57 including an emitter resistor 58, to the non-inverting input 37 of comparator 34.

As can be seen in FIG. 1, triangular-wave generator 32 is also charged with the rpm reference signal via a reference voltage line 59. The sawtooth signal is inverted in triangular-wave generator 32 and the inverted signal is fed together with the original signal to an analog comparison stage which forwards the respective larger one of the two signals as output signal to output 46. The rpm reference voltage here serves as a reference for the inversion.

FIG. 3 shows how the functions of triangular-wave generator 32 can be realized with few components, namely two transistors 60 and 61 and three resistors 62, 63 and 64. Resistors 62 and 63 have approximately the same resistance values, with resistor 62, for example, having a value of 43 kiloohms and resistor 63 a value of 33 kiloohms.

If the sawtooth signal voltage fed from output 23 to control input 31 via line 65 lies near 0 volt, transistor 60 is not conductive so that a high voltage corresponding to the rpm reference voltage is present at its collector. With increasing sawtooth voltage, transistor 60 becomes more and more conductive so that its collector-emitter voltage drops and the voltage drop across resistor 62 increases. The base voltage fed to the base of transistor 61 drops correspondingly so that the voltage across resistor 64 drops. During the rise of the sawtooth signal voltage, a point in time is reached at which transistor 60 has switched through completely and the collector-emitter voltage is very low. At this time, the voltage at the collector of transistor 60 has reached its lowest value. When the sawtooth signal voltage increases further, the voltage at the collector of transistor 60 increases again causing the voltage at resistor 64 to increase as well. In this way, components 60 to 64 generate a synchronized triangular-wave signal. It should be noted that, due to the above-described regulating circuit, the triangular-wave signal voltage has a maximum amplitude which lies slightly below the voltage of the rpm reference voltage which is, for example, 4 volts, so that an amplitude which triangularly fluctuates between 2 and 4 volts results for the triangular-wave signal at the collector of transistor 60. The triangular-wave signal is forwarded by transistor 61 which operates as an impedance converter and is picked up at resistor 64 so that the charging voltage signal can be superposed on it in charging capacitor 45.

FIG. 3 also shows how alarm comparator 36 is connected with the operating voltage via a light-emitting diode 67 and a resistor 66.

As mentioned above, current source 21 is a controllable or controlled current source. By changing the current furnished by current source 21, it is possible for the circuit shown in FIG. 1 to specify a temperature-rpm characteristic corresponding to a temperature detected by an NTC resistor 70. To accomplish this, in addition to NTC resistor 70, resistors 71, 72, 73 and 74 are provided which furnish, via symbolically shown linkage circuits or comparison circuits 75 and 76 and via a control line 77, a control signal to controllable current source 21 in dependence on the ambient temperature. The arrangement shown in FIG. 1 makes it possible, for example, to obtain a constant rpm for the d.c. motor at temperatures up to 30°, with such rpm being independent of the motor parameters and independent of the load of the motor. Only if the temperature detected by NTC resistor 70 increases beyond 30°, is current source 21 adjusted so that with increasing temperature an increasing rpm is realized. The maximum rpm is reached, for example, at 50°. Thereafter, the rpm remains constant again, preferably somewhat below the maximum rpm the motor is able to attain without regulation.

The analog comparator 75 which compares the voltage drop across NTC resistor 70 with that across the voltage divider composed of resistors 72, 73, 74, forwards the smaller one of these voltages as its output signal. This smaller voltage is associated with an rpm below, for example, 30°. If the temperature increases to above 30° C., the voltage dropped across NTC resistor 70 is the lower voltage and is forwarded by comparator 75 to comparator 76. If the voltage which is determined by the temperature value at NTC resistor 70 drops below a value associated, for example, with a temperature of 50°, comparator 76 forwards the voltage picked up between resistors 72 and 73 which is constant and determines the maximum rpm.

FIG. 4a shows a voltage curve $U_{141/142}$ at the outputs 141 and 142 of Hall element 14. Hall signal amplifiers 15 and 16 generate, from the Hall signals, i.e. from the voltage curve $U_{141/142}$, two rectangular signals $U_{150}$ and $U_{160}$, respectively, which are offset by 180° el, as shown in FIGS. 4b and 4c. A descending edge 158 (trailing edge) is followed by an ascending edge 157 (leading edge) at the output of the respective other amplifier 16 or 15.

In each one of the thus formed pulse pauses 155 (FIG. 4d) of the signals furnished by Hall signal amplifiers 15 and 16, transistor 27 switches through. After a trailing edge 158 of the Hall signal pulse at the output of one of amplifiers 15 or 16, the respective other amplifier 16 or 15 furnishes a leading edge 157. During this time, charging capacitor 22 is kept discharged. Thereafter, charging voltage $U_{23}$ (FIG. 4e) is able to rise until the next pulse pause 155.

The curve of sum signal $U_{30*}$ shown in FIG. 4d formed from the output signals of amplifiers 15 and 16 acts behind coupling resistors 29 and 30 on the base of transistor 27.

If connected to 0 potential (numeral 8) and with the collector of comparator 34 open, capacitor 45 would be charged slowly (time constant $\tau_{charge} \approx 20 * \tau_{discharge}$) and would be discharged quickly (time constant $\tau_{discharge}$ relatively small) if the collector is closer. This charging and discharging takes place periodically in the same manner as sawtooth signal $U_{33} (=U_{23})$ at the inverting input 33 exceeds the reference voltage $U_{37}$ at the non-inverting input 37.

However, charging capacitor 45 is connected with the output 46 of delta generator 32. Therefore the "charging voltage" acting on point of connection 48 has superposed on it the delta signal voltage $U_{46}$ furnished by delta generator 32 (shown in FIG. 4g). The voltage $U_{48}$ combined of the charging voltage component $U_{48*}$ and the delta signal voltage component $U_{46}$ acts via resistor 49 on the input of inverter amplifier 13.

FIG. 4f shows the "charging voltage" component $U_{48*}$ and its average $\overline{U_{48*}}$.

FIG. 4h shows the actual curve of voltage $U_{48}$ at point 48. It is formed of the alternating component of $U_{46}$ (see FIG. 4g) and the direct voltage component at connection 48 (shown in FIG. 4f as $U_{48*}$ together with its average $\overline{U_{48*}}$).

Preferably, current source 21 is a current source which is controllable or controlled by an NTC resistor 70. By changing the current furnished by current source 21, the amplitude of sawtooth signal 23 is changed and it is possible with the circuit shown in FIG. 1 to predetermine a temperature/rpm characteristic depending on the temperature detected by an NTC resistor 70.

Figure 5A:
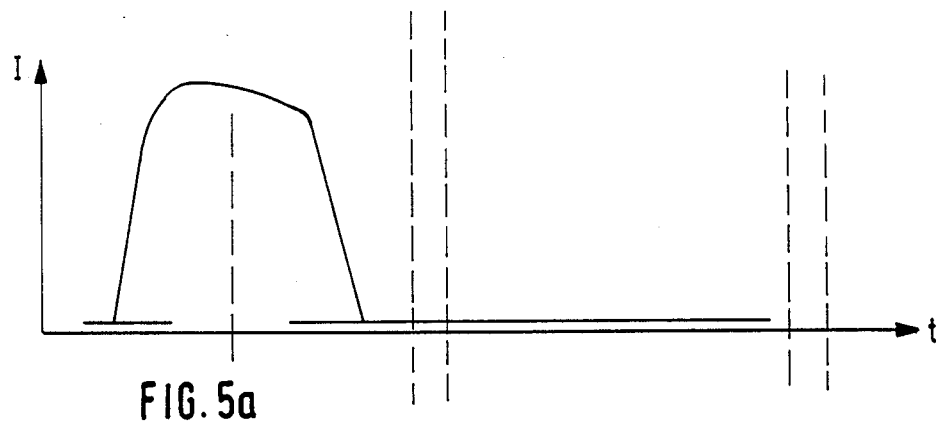
FIG. 5a which shows the current curve during phase 1 of the motor.
Figure 5B:
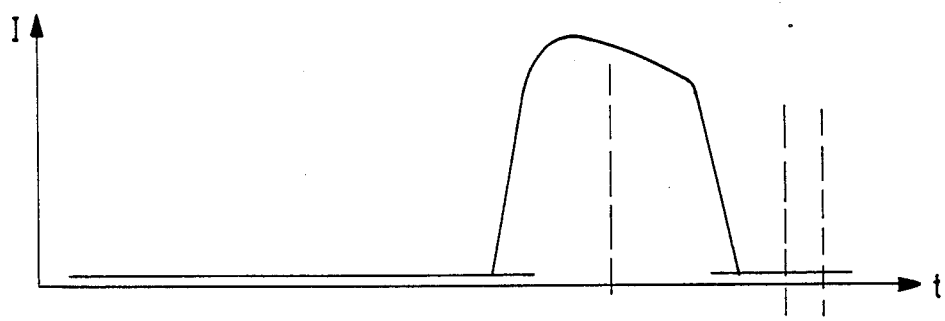
FIG. 5b which shows the current curve during phase 2 of the motor.

FIGS. 5a and 5b show the typical current curve during phase 1 and 2, respectively, of the motor.

I claim:

1. A device for electronically regulating the speed of a rotor of a brushless d.c. motor having at least one stator winding, the motor having an on state in which a current in the form of a pulse having ramped on and off edges is fed to the at least one stator winding and an off state in which a current is not fed to the stator winding, the device comprising:
   a frequency to voltage converter having means, responsive to a frequency-modulated signal whose frequency is proportional to the speed of the motor, for generating a periodic signal having a signal value which changes monotonically during each period of the periodic signal and has a limit value at the end of the period of the periodic signal which is proportional to the speed of the motor;
   means for applying current pulses to the stator winding at a rate which is proportional to the speed of the motor;
   a comparator stage having means, responsive to the periodic signal, for generating a comparator output signal having a value which is proportional to the limit value at the end of each period; and
   a triangular-wave generator having means, responsive to the periodic signal during each respective period, for generating a triangularly shaped signal having a peak formed at approximately the midpoint of the duration of the period, said applying means having means, responsive to the comparator output signal and said triangularly shaped signal, for controlling the duration of each of the current pulses, the duration controlling means including means, responsive to the triangularly shaped signal, for controlling the on and off edges of each current pulse.

2. A device as in claim 1, wherein said comparator stage includes:
   means for producing a d.c. component which is proportional to the limit value, and superposing the triangularly shaped signal and the d.c. component to form a superposed signal, and means, responsive to the superposed signal and the frequency-modulated signal, for forming the current pulses at the frequency of the frequency modulated signal and with durations which are controlled by the superposed signal.

3. A device as in claim 1, wherein the at least one stator winding includes two stator windings and the current pulses are applied to the respective two winding at a rate which is invariably coupled to the value of the speed of the motor of 1:2.

4. A device for electronically regulating the speed of a permanently magnetic rotor of a brushless d.c. motor having at least two poles, at least one stator winding, and a sensor which outputs a periodic sensor signal indicative of rotor position, the device comprising:
 an end stage having means for temporarily operating as a switch and temporarily operating in an analogue domain;
 a sawtooth-wave-generator having means, responsive to the periodic sensor signal, for generating a periodic sawtooth-wave voltage of predetermined slope;
 a comparator having an output port and having means, responsive to the sawtooth-wave voltage, for comparing the sawtooth-wave voltage with a motor speed reference signal voltage and outputting a comparison signal indicative of which of the sawtooth-wave voltage and motor speed reference signal voltage is higher, the comparison signal having a d.c. component;
 a summation device;
 a low-pass filter connected to the output port of said comparator for transferring therethrough the d.c. component;
 a triangular-wave generator having means, responsive to the periodic sawtooth-wave voltage, for generating a triangularly shaped signal synchronized with the sawtooth-wave voltage;
 means for coupling the d.c. component transferred through said filter and the triangularly shaped signal to said summation device, said summation device having an output signal which represents a sum of the d.c. component and the triangularly shaped signal; and
 a linkage circuit having means, responsive to the output signal of said summation device and the sensor signal, for generating during each period an end stage control signal which is variable in time and has a duration which is shorter than the duration of the sensor signal;
 said end stage comprising means, responsive to said end stage control signal, for generating current pulses of duration shorter than the duration of the sensor signal, with ramp-shaped leading and following edges, for application to the at least one stator winding.

5. A device as in claim 4, wherein said summation device comprises at least one operational amplifier.

6. A device as in claim 4, wherein the lowpass filter comprises an RC lowpass filter.

7. A device as in claim 6, wherein said RC lowpass filter includes a capacitor, first and second resistors, the first resistor having a greater resistance than the second resistor, means for charging said capacitor through said first resistor, and means for discharging said capacitor through said second resistor.

8. A device as in claim 7, wherein said capacitor coupled an output port of said triangular-wave generator to an input port of said summation device.

* * * * *